Dec. 25, 1945.  C. H. INESON  2,391,421

SELF-LOCKING NUT

Filed July 16, 1943

INVENTOR
Clifton H. Ineson
BY
Kenyon & Kenyon
ATTORNEYS

Patented Dec. 25, 1945

2,391,421

UNITED STATES PATENT OFFICE 2,391,421

SELF-LOCKING NUT

Clifton H. Ineson, Oakville, Conn., assignor, by mesne assignments, to Allied Control Company, Inc., New York, N. Y., a corporation of New York Application July 16, 1943, Serial No. 494,904

3 Claims. (Cl. 151—7)

This invention relates to self-locking nuts.

A self-locking nut now on the market comprises a casing in the form of a cup having a base provided with an aperture and the side wall being of polygonal contour to define a polygonal socket. A metal nut member and a preferably elastic locking member are positioned within the casing and have their peripheries shaped so as to fit the inside of the casing. Each wall portion terminates in a tapering integral tab, the base of which is co-extensive with the top edge of the corresponding wall portion and such tabs are inturned over the locking member to retain it and the nut member in the socket.

An object of this invention is a self-locking member of the general type above described in which reinforcement is provided at the nut corners.

In accordance with this invention, the tabs, instead of having their base portions co-extensive with the top edges of corresponding wall portions, are so arranged that the base of each tab extends across a nut corner so that the tabs are of a solid character at the points where the greatest strain may occur. The split between two adjacent tabs occurs midway between the nut corners rather than at the nut corners as in the previously referred-to nut.

Other objects, novel features and advantages of this invention will become apparent from the following specification and accompanying drawing, wherein.

Figure 1:
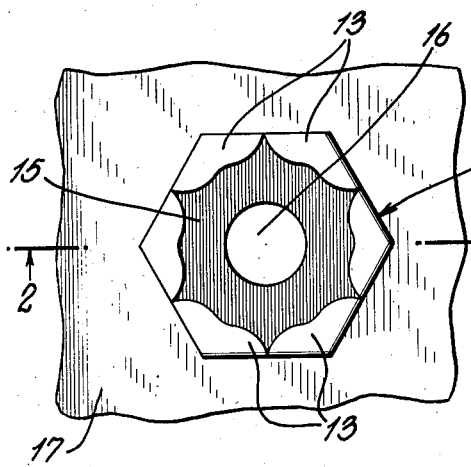
Fig. 1 is a plan view of a self-locking nut embodying the invention with a bolt inserted and serving to hold together two plates.
Figure 2:
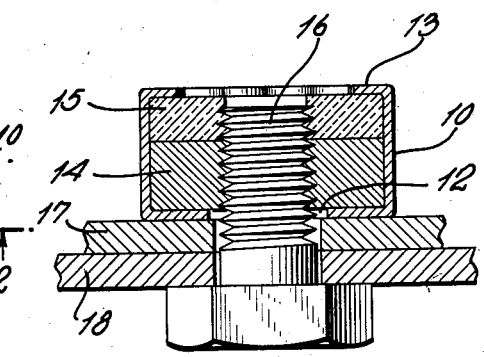
Fig. 2 is a section on the line 2—2 of Fig. 1.
Figure 3:
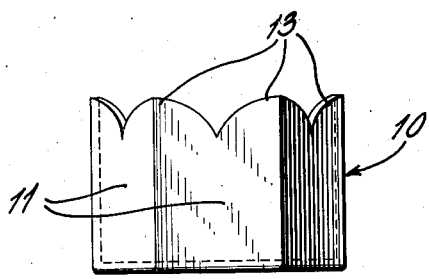
Fig. 3 is a side elevation of the nut casing.
Figure 4:
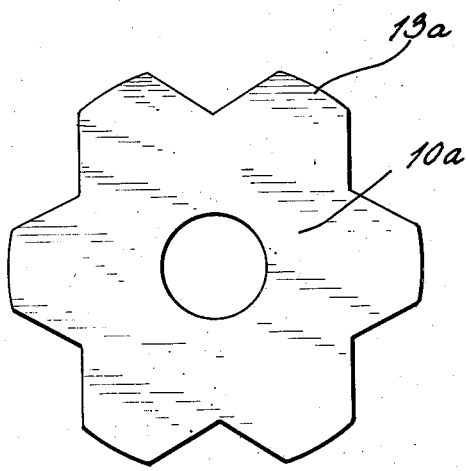
Fig. 4 is a plan view of the blank from which the casing is obtained.

A nut embodying this invention comprises a sheet metal cup or casing 10 formed from a blank 10a in such a manner as to have a series of flat wall portions 11 defining a polygonal socket. The flat portions 11 form surfaces on which a wrench may obtain a grip. The bottom of the cup is provided with a hole 12 and the upper edge is scalloped or otherwise provided with extending tapered portions or tabs 13 which are adapted to be inturned as later to be described. The tabs are formed by the portions 13a of the blank 10a.

After the formation of the casing a nut member 14 is inserted therein in contact with the casing bottom and a locking member 15 is placed on the nut member. Preferably, the nut member and the locking member are of the same configuration as the interior of the casing and fit the casing closely enough to prevent rotation thereof relative to the casing. The bore of the nut 14 is threaded while the bore of the locking member 15 is smooth and of less diameter than the major diameter of the nut member thread. The locking member may be of material known as vulcanized fiber, Bakelite, rubber or other elastic and relatively tough material of like nature.

After location of the nut member 14 and locking member 15 in the casing 10, the tabs 13 are inturned over the locking member 15 to retain both the locking member and nut member in the casing. Each tab is of greater extent at a corner of the casing than elsewhere and each tab is of zero extent intermediate the casing corners. With this arrangement, reinforcement is provided at the casing corners so that the casing is of solid character at the corners where the greatest strain may occur when the nut is being threaded onto a bolt by means of a wrench. The splits between the tabs occur at the midpoint of a wall portion where only minor strains are produced.

In use, a bolt 16 passes through members 17 and 18 to be held together and enters the nut through the bottom aperture 12. The bolt is threaded into the nut member 14 in the usual manner and as the bolt projects into the locking member 15 it cuts a thread therein. The locking member 15 serves to prevent accidental rotation of the assembly in the well-known manner.

It is of course understood that various modifications may be made in the nut structure above described without in any way departing from the spirit of the invention as defined in the appended claims.

I claim:

1. A self-locking nut comprising in combination a casing having a base provided with an aperture and side members so arranged that the casing is polygonal in transverse cross-section, a nut member and an elastic locking member positioned within said casing and each member having its sides shaped so as to fit snugly the sides of the casing, said casing having at each corner a symmetrically arranged extension bent inwardly over said locking member to retain said nut member and locking member within the casing and each extension being of greatest extent along a line connecting opposite corners of said nut and throughout its entire extent being uninterrupted from one casing side to the adjacent casing side thus forming a corner brace.

2. A self-locking nut comprising in combination a casing having a base provided with an aperture and side members so arranged that the casing is polygonal in transverse cross-section, a nut member and an elastic locking member positioned within said casing and each member having its sides shaped so as to fit snugly the sides of the casing, said casing having at each corner a symmetrically arranged extension bent inwardly over said locking member to retain said nut member and locking member within the casing and each extension being of maximum extent along a line connecting opposite corners of the nut and of zero extent intermediate the nut corners and throughout its whole extent being uninterrupted from one casing side to the adjacent casing side, thus forming a corner brace.

3. A self-locking nut comprising in combination a casing having a base provided with an aperture and side members so arranged that the casing is polygonal in transverse cross-section, a nut member and an elastic locking member positioned within said casing and each member having its sides shaped so as to fit snugly the sides of the casing, said casing having its free edge terminating in a series of tapering extensions bent inwardly against the adjacent face of said locking member to hold the locking and nut members within said casing as a unitary structure, each casing corner having a tapering extension arranged symmetrically with respect to the corner and throughout its whole extent being uninterrupted from one casing side to the adjacent casing side thus forming a corner brace.

CLIFTON H. INESON.